United States Patent [19]

Forsberg

[11] Patent Number: 4,643,568

[45] Date of Patent: Feb. 17, 1987

[54] METHOD AND APPARATUS FOR MEASURING THE ILLUMINATING POWER OF INCIDENT LIGHT

[75] Inventor: Gunnar S. Forsberg, Stockholm, Sweden

[73] Assignee: Telefonaktiebolaget LM Ericsson, Stockholm, Sweden

[21] Appl. No.: 712,625

[22] Filed: Mar. 18, 1985

[30] Foreign Application Priority Data

Apr. 5, 1984 [SE] Sweden ............................ 8401912

[51] Int. Cl.⁴ .............................................. G01J 1/46
[52] U.S. Cl. ..................................... 356/218; 307/311
[58] Field of Search ................ 356/218, 227; 307/311

[56] References Cited

U.S. PATENT DOCUMENTS 2,862,416 12/1958 Doyle .................................. 307/311
4,469,958 9/1984 Schmitt ............................... 307/311
4,502,937 3/1985 Yagi .................................... 307/311
4,564,770 1/1986 Sherman et al. .................... 307/311

Primary Examiner—R. A. Rosenberger
Attorney, Agent, or Firm—Roberts, Spiecens & Cohen

[57] ABSTRACT

The invention relates to measuring illuminating power of light incident on a light sensor without an outside power supply. The light is converted conventionally to a pulse train, the frequency of which varies as the illuminating power. During conversion the incident light illuminates a series connection (2) of a plurality of photo diodes, which thus generate a current. This is utilized as a power source for the converter and also as electrical input quantity for the conversion itself. The pulse train generated by the converter comprises light pulses, the frequency of which is detected at the converter or at the other end of an optical fibre (7) coupled to it.

7 Claims, 2 Drawing Figures

METHOD AND APPARATUS FOR MEASURING THE ILLUMINATING POWER OF INCIDENT LIGHT

TECHNICAL FIELD

The present invention relates to a method and apparatus for measuring the illuminating power of light incident on a light sensor that does not have an outside power supply.

BACKGROUND ART

For measuring the illuminating power of light it is already known to couple the light into an optical fibre and connect a radiometer at the other end of the fibre. The advantage of such an arrangement is that it is relatively simple and inexpensive. However, there are a number of sources of error, which make the measuring method inaccurate and the arrangement difficult to calibrate. The light which is transmitted to the radiometer is namely affected by fibre attenuation and contact attenuation. Furthermore the light is attenuated spectrally in the fibre in an uncontrollable manner.

A still further conventional measuring method is described in the article "Photocurrent-to-frequency converter notes light levels", published in Electronics, Feb. 10, 1982 on pages 141-143. According to this method the light that is to have its illuminating power measured is converted to a frequency depending on the illuminating power. The conversion is performed with the aid of a photo diode which generates an electric current in response to the illuminating power. The current charges a capacitor, after which a level-sensing circuit generates a voltage pulse when the capacitor voltage has attained a given value. The capacitor is discharged simultaneously, after which the cycle is repeated at a rate which is dependent on the mentioned current, and thereby on the incident illuminating power. A disadvantage with this method is that an outside voltage must be supplied to the measuring apparatus for supplying the components included therein.

DISCLOSURE OF INVENTION

An object of the present invention is to provide a method and apparatus not having the disadvantages burdening the already-known arrangements. There is thus eliminated the measuring errors caused by fibre attenuation and the spectral properties of the fibre in spite of the apparatus in accordance with the invention working without an outside power supply. This results in that, inter alia, it may be used in environments with explosive hazards. It can also be made small and relatively inexpensive. This is achieved by a method and apparatus having the distinguishing features apparent from the accompanying claims.

BRIEF DESCRIPTION OF DRAWING

The invention will now be described in detail with reference to the accompanying drawing, on which.

BEST MODE FOR CARRYING OUT THE INVENTION

Figure 1:
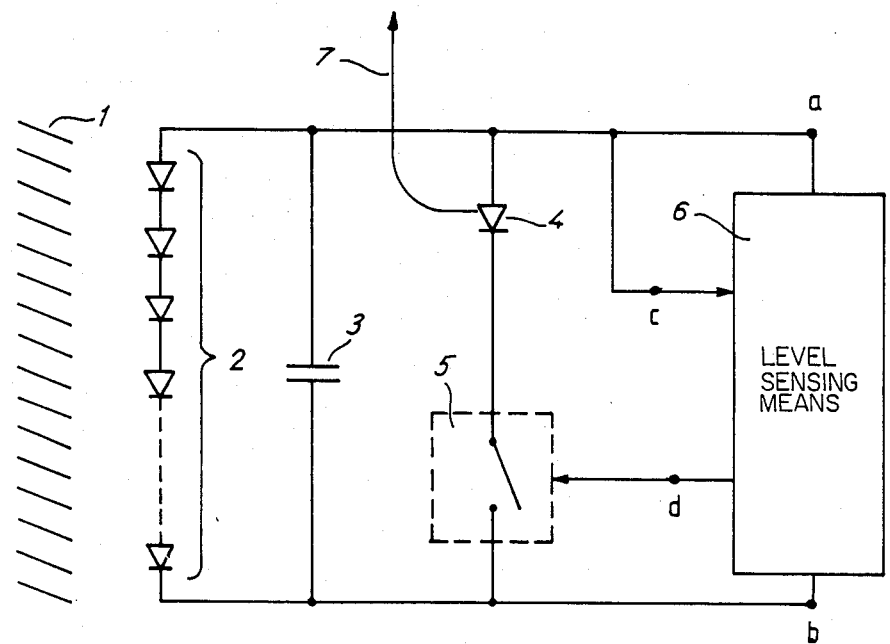
FIG. 1 is a wiring diagram of an embodiment of the apparatus in accordance with the present invention and
FIG. 2 illustrates a more detailed implementation of a level-triggered pulse sender included in the apparatus according to FIG. 1.

In the embodiment according to FIG. 1, light 1 is illustrated incident on a photo-electrical converter 2 in the form of a plurality of series-connected photo diodes. Each photo diode functions as a current generator if the forward voltage is sufficiently low (0.3V). This is called photovoltaic operation of the photo diode. About 10-30 diodes is a suitable number in the series connection 2 of the diodes. An accumulating element 3 in the form of a capacitor is connected in parallel with the series connection 2 of the photo diodes. In parallel with these there is also connected a series connection consisting of an electro-optical converter 4, in the form of a light or laser diode, and a controllable switching element 5, which may be a transistor. There is finally a level-sensing elements 6 in the form of a level-triggered pulse sender connected in parallel with the series-connected photo diodes. The pulse sender is supplied with voltage via the intersection points a and b, and sends a pulse of short duration on an output d, coupled to a control input of the switching element 5, if the voltage on an input c connected to the intersection point a exceeds a predtermined value. An unillustrated measuring element for detecting the frequency of the light pulse is optically coupled to the diode 4, possibly via an optical fibre 7.

The circuit operates in the following manner: When the light 1 impinges against the series connection 2 of photo diodes, these generate a current varying as the illuminating power. The current charges the capacitor 3, the voltage of which is utilized as driving voltage to the level sensing means 6, via the intersection points a and b, and it is also level—supervised by this means 6. When the voltage at the input c of the means attains the predetermined value, a control pulse is sent to the switching element 5. The element closes for the duration of the control pulse, the capacitor 3 being discharged via the diode 4. The latter thus generates a light pulse. This cycle is then repeated at a rate varying as the current from the series connection 2 of photo diodes. The frequency of the light pulses generated by the diode 4 thus constitutes a measure of the illuminating power of the incident light.

If the duration of the control pulse and the current in the level sensing means sender 6 are ignored, the pulse frequency will be practically directly proportional to the unknown illuminating power. To attain high linearity, the duration of the control pulse should be short compared with the time between two pulses. In practice it is possible to provide a measuring range with a linearity of several decades.

The frequency of the light pulses is detected by a conventional, unillustrated measuring element, placed at the diode 4 or at the other end of an optical fibre 7 connected to the diode 4.

Figure 2:
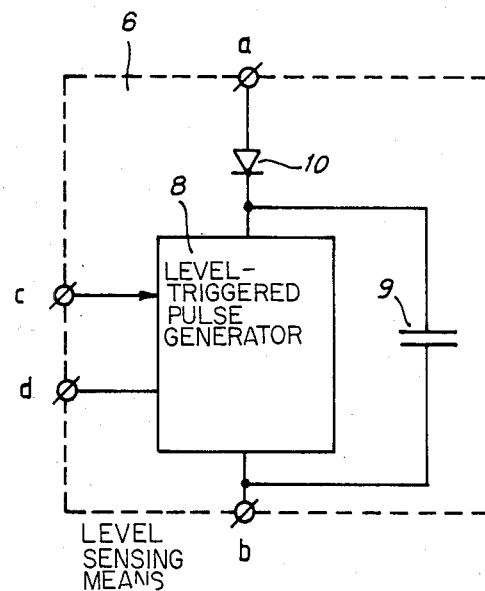

A more detailed implementation of the level sensing means 6 is illustrated in FIG. 2. A conventional-level-triggered pulse generator 8 is connected in parallel with a capacitor 9. A diode 10 is connected between this parallel connection and the intersection point a. The pulse generator 8 obtains its feed voltage from the capacitor 9. When the voltage between the intersection points a and b disappears, there is voltage left across the capacitor 9, since the diode 10 is reversed biased when the voltage falls.

According to a further conceivable embodiment, the functions of the level sending means 6 may be incorporated in the controllable switching element 5, these elements thus being caused to form a unit.

To obtain a more uniform spread of the light 1 incident against the series coupling 2 of photo diodes, a diffusing plate may be placed in front of the photo diodes. In this way the error in measurement which can occur due to the photo diodes being differently illuminated may be reduced.

To enable light measurement within special wavelength ranges, a wavelength-selective filter may also be placed in front of the photo diodes 2. This enables measurements within wavelength ranges which the fibre 7 can not per se transmit due to excessive attenuation.

Finally, there should be some form of current limitation in the current path which is formed when the switching element 5 in FIG. 1 is closed. Otherwise the diode 4 may be destroyed. This current limitation can comprise the impedance of the current path, or a current limitation in the switching element.

I claim:

1. Apparatus requiring no external power supply for indicating the intensity of light in a region comprising photoelectric means in the region for generating an electrical quality which varies as the light intensity varies, accumulating means connected to said photoelectric means for generating an accumulated quality related to said electrical quality, level sensing means for emitting a control pulse whenever said accumulated quality exceeds a given amplitude, switching means activated by each control pulse from said level sensing means for discharging said accumulating means, light pulse generating means connected to said switching means for emitting a light pulse each time said switching means is actuated, and means for giving an indication of the intensity of the light as a function of the frequency of the light pulses.

2. The apparatus of claim 1 wherein said photoelectric means comprises a plurality of serially connected photo diodes.

3. Apparatus of claim 1 wherein said accumulating means comprises a capacitor.

4. Apparatus of claim 1 wherein said level sensing means comprises a level-triggered pulse generator and a diode connected in series, and a capacitor connected in parallel with said level-triggered pulse generator.

5. Apparatus of claim 1 wherein said level sensing means and said switching means are one unit.

6. Apparatus requiring no external power supply for indicating the intensity of light in a region comprising a plurality of serially connected photo diodes in the region, a capacitor connected in parallel with said photo diodes, a level sensing means connected in parallel with said capacitor for giving a control pulse whenever the voltage across said capacitor exceeds a given amplitude, and a capacitor discharge means including a light emitting diode and a control-pulse responsive switch for discharging said capacitor upon receipt of a control pulse from said level sensing means whereby the capacitor discharge current flows through said light emitting diode so that the frequency of the light pulses resulting from the discharging of said capacitor is an indication of the intensity of the light in the region.

7. The apparatus of claim 6 wherein said level sensing means comprises a diode and level-triggered pulse generator connected in series and another capacitor connected in parallel with said level-triggered pulse generator.

* * * * *